(12) United States Patent
Kashiwagi et al.

(10) Patent No.: US 7,705,093 B2
(45) Date of Patent: Apr. 27, 2010

(54) PHOSPHOR-FILLED CURABLE SILICONE RESIN COMPOSITION AND CURED PRODUCT THEREOF

(75) Inventors: Tsutomu Kashiwagi, Annaka (JP); Toshio Shiobara, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 207 days.

(21) Appl. No.: 11/762,445

(22) Filed: Jun. 13, 2007

(65) Prior Publication Data

US 2007/0293623 A1 Dec. 20, 2007

(30) Foreign Application Priority Data

Jun. 14, 2006 (JP) ............... 2006-165300

(51) Int. Cl.
*C08G 77/04* (2006.01)
(52) U.S. Cl. ................ 525/474; 525/477; 525/478; 528/14; 528/31; 528/32
(58) Field of Classification Search ........... 525/478; 524/588
See application file for complete search history.

(56) References Cited

U.S. PATENT DOCUMENTS

| | | | | |
|---|---|---|---|---|
| 5,314,979 A | * | 5/1994 | Okinoshima et al. | 528/15 |
| 6,285,513 B1 | * | 9/2001 | Tsuji et al. | 359/718 |
| 6,806,509 B2 | * | 10/2004 | Yoshino et al. | 257/103 |
| 2005/0280017 A1 | | 12/2005 | Oshio et al. | |

FOREIGN PATENT DOCUMENTS

| | | |
|---|---|---|
| EP | 1 770 127 | 4/2007 |
| JP | 2001-2922 | 1/2001 |
| JP | 2005-76003 | 3/2005 |
| WO | WO 2005-043631 | 5/2005 |

OTHER PUBLICATIONS

U.S. Appl. No. 11/623,494, filed Jan. 16, 2007, Kashiwagi.

* cited by examiner

*Primary Examiner*—Randy Gulakowski
*Assistant Examiner*—Kyle Baumstein
(74) *Attorney, Agent, or Firm*—Oblon, Spivak, McClelland, Maier & Neustadt, L.L.P.

(57) ABSTRACT

A phosphor-containing addition-curable silicone resin composition is provided. The composition is capable of forming a cured product which exhibits excellent crack resistance and shock resistance, and minimal surface tackiness. The composition includes (A) an organopolysiloxane including $R^1SiO_{1.5}$ units (T units), $R^2{}_2SiO$ units (D units), and $R^3{}_aR^4{}_bSiO_{(4-a-b)/2}$ units (wherein, $R^1$, $R^2$ and $R^3$ represent a methyl group or the like, $R^4$ represents a vinyl group or allyl group, a represents an integer from 0 to 2, b represents 1 or 2, and a+b is either 2 or 3), in which the number of repetitions of the D units is within a range from 5 to 300; (B) an Si—H-containing polysiloxane including T units, D units, and $R^3{}_cH_dSiO_{(4-c-d)/2}$ units (wherein, c represents an integer from 0 to 2, d represents 1 or 2, and c+d is either 2 or 3), in which the number of repetitions of the D units is within a range from 5 to 300, in sufficient quantity that the molar ratio of Si-bonded hydrogen atoms within (B), relative to vinyl groups or allyl groups within (A), is within a range from 0.1 to 4.0; (C) a catalyst; and (D) a phosphor.

19 Claims, 1 Drawing Sheet

PHOSPHOR-FILLED CURABLE SILICONE RESIN COMPOSITION AND CURED PRODUCT THEREOF

BACKGROUND OF THE INVENTION

1. Field of the Invention

The present invention relates to an addition-curable silicone resin composition that can be used favorably for sealing LED elements and the like, and relates particularly to a silicone composition that yields a cured product with superior surface tackiness and favorable strength characteristics, and a cured product of such a composition.

2. Description of the Prior Art

Silicone rubber compositions form cured products that exhibit excellent properties of weather resistance and heat resistance and the like, as well as superior rubber-like properties such as hardness and elongation, and they are consequently used in a wide variety of applications, but because they also exhibit surface tackiness, dust adhesion becomes a problem when such silicone rubber compositions are used as coating agents or the like for electrical or electronic components.

Silicone varnishes exhibit no surface tackiness, meaning dust adhesion is unlikely, but a significant problem arises in that because they lack adequate shock resistance, they tend to be prone to cracking, particularly when exposed to thermal shocks.

In addition-curable silicone rubber compositions, the addition of a resin-like organopolysiloxane component to improve the strength of the cured product is a commonly known technique (patent reference 1). However, even in those cases where the strength of the cured product is raised, surface tackiness and dust adhesion remain problems.

Silicone rubbers attract attention as coating materials for sealing or protecting LED elements as they have good light-resistance. In a white LED device a blue light emitting LED element is covered with a silicone resin layer containing a phosphor. The wavelength of blue light emitted from the LED element is shifted to that of pseudo-white light. Such a silicone layer is formed from an addition-curable silicone rubber composition to which a phosphor has been added. Thus, pseudo-white light with excellent color rendering properties can be obtained. However, if settling of the phosphor occurs within the composition, then variations develop in the color rendering. As a countermeasure, a method has been proposed in which a nanosilica is added to prevent this settling from occurring (patent reference 2).

Furthermore, in order to resolve these problems, it is desirable that the material is able to be readily molded using a conventional molding apparatus such as a transfer molding, compression molding, or injection molding apparatus.

As a result, a silicone composition capable of forming a cured product within a package of electrical or electronic components or the like, wherein dust does not adhere to the surface of the cured product, and the cured product exhibits excellent levels of crack resistance and shock resistance, is keenly sought. Furthermore, a composition that is a solid or semisolid at room temperature (namely, 20° C.±10° C.), and is able to be cured using a conventional molding apparatus would be particularly desirable.

Examples of the conventional technology relating to the present invention include the publications below.

[Patent Reference 1] Japanese Laid-open publication (kokai) No. 2001-002922

[Patent Reference 2] Japanese Laid-open publication (kokai) No. 2005-76003

SUMMARY OF THE INVENTION

An object of the present invention is to provide an addition-curable silicone resin composition which is capable of forming a cured product that exhibits excellent flexibility despite being a hard resin, and therefore exhibits excellent crack resistance and shock resistance, and also forms a cured product with minimal surface tackiness, and can be readily molded using a conventional molding apparatus.

As a result of intensive investigation aimed at addressing the above problems, the inventors of the present invention discovered that an addition-curable silicone resin composition that uses an alkenyl group-containing organopolysiloxane having a specific resin structure and an organohydrogenpolysiloxane having a specific resin structure was able to achieve the object described above, and they were therefore able to complete the present invention.

In other words, in order to achieve the above object, a first aspect of the present invention provides A curable silicone resin composition, comprising:

(A) a resin-structure organopolysiloxane comprising $R^1SiO_{1.5}$ units, $R^2{}_2SiO$ units, and $R^3{}_aR^4{}_bSiO_{(4-a-b)/2}$ units (wherein, $R^1$, $R^2$ and $R^3$ each represent, independently, a methyl group, ethyl group, propyl group, cyclohexyl group or phenyl group, $R^4$ represents a vinyl group or allyl group, a represents 0, 1 or 2, b represents 1 or 2, and a+b is either 2 or 3), and comprising a structure in which at least a part of said $R^2{}_2SiO$ units are repeated, and a number of repetitions of said $R^2{}_2SiO$ units is within a range from 5 to 300;

(B) a resin-structure organohydrogenpolysiloxane comprising $R^1SiO_{1.5}$ units, $R^2{}_2SiO$ units, and $R^3{}_cH_dSiO_{(4-c-d)/2}$ units (wherein, $R^1$, $R^2$ and $R^3$ are as defined above, c represents 0, 1 or 2, d represents 1 or 2, and c+d is either 2 or 3), and comprising a structure in which at least a part of said $R^2{}_2SiO$ units are repeated, and a number of repetitions of said $R^2{}_2SiO$ units is within a range from 5 to 300: in sufficient quantity that a molar ratio of hydrogen atoms bonded to silicon atoms within component (B), relative to vinyl groups or allyl groups within component (A), is within a range from 0.1 to 4.0;

(C) an effective quantity of a platinum group metal-based catalyst; and (D) a phosphor.

Furthermore, the present invention also provides the following compositions as preferred embodiments of the above composition.

A second aspect is an aforementioned curable silicone resin composition that is a solid at room temperature.

A third aspect is an aforementioned curable silicone resin composition, wherein the component (A) and/or the component (B) comprises a silanol group.

A fourth aspect is an aforementioned curable silicone resin composition, wherein a cured product of the composition excluding the component (D) has a light transmittance of 90% or greater in a visible light region from 400 nm.

A fifth aspect is an aforementioned curable silicone resin composition, wherein the phosphor of the component (D) is an inorganic phosphor with a particle size of 10 nm or greater.

A sixth aspect is an aforementioned curable silicone resin composition that is used for sealing an LED element.

Furthermore, the present invention also provides, as a seventh aspect, a silicone resin cured product obtained by curing an aforementioned curable silicone resin composition.

Upon curing, a composition of the present invention yields a cured product that exhibits excellent flexibility despite being a hard resin, and not only exhibits excellent crack resistance and shock resistance, but also displays minimal surface tackiness. This composition offers another advantage in that because it can be readily molded even with a conventional molding apparatus, conventional molding apparatus can be used.

In an embodiment in which the composition of the present invention is a solid at room temperature, even if the composition is stored for an extended period, problems such as settling of the phosphor filler do not occur. Accordingly, the composition exhibits a high level of stability, with no variation or fluctuation in the light-emitting properties when the composition is stored for extended periods.

DETAILED DESCRIPTION OF THE PREFERRED EMBODIMENTS

Figure 1:
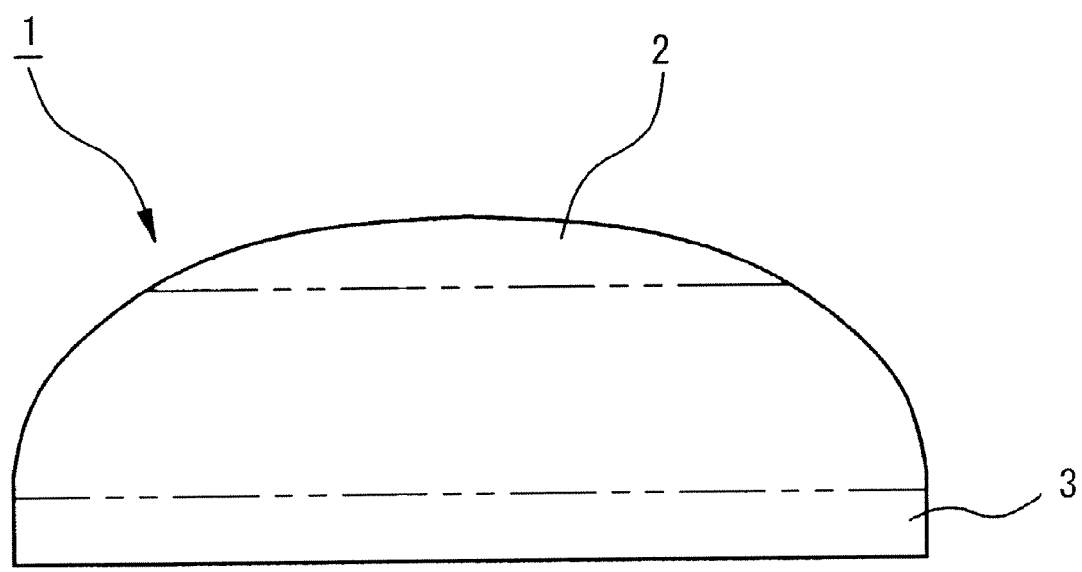
FIG. 1 illustrates a front view showing a lens molded product prepared for evaluating the dispersion stability of a phosphor within a composition.

As follows is a more detailed description of the present invention.

—(A) Resin-structure Organopolysiloxane—

The resin-structure (namely, three dimensional network structure) organopolysiloxane (A), which represents an essential structural component of the composition of the present invention, comprises $R^1SiO_{1.5}$ units, $R^2_2SiO$ units, and $R^3_aR^4_bSiO_{(4-a-b)/2}$ units (wherein, $R^1$, $R^2$ and $R^3$ each represent, independently, a methyl group, ethyl group, propyl group, cyclohexyl group or phenyl group, $R^4$ represents a vinyl group or allyl group, a represents 0, 1 or 2, b represents 1 or 2, and a+b is either 2 or 3), and comprising a structure in which at least a part of said $R^2_2SiO$ units are repeated, and the number of repetitions of the $R^2_2SiO$ units is within a range from 5 to 300. In said structure, the number of repetitions of the $R^2_2SiO$ units is within a range from 5 to 300, and is preferably from 10 to 300, even more preferably from 15 to 200, and is most preferably from 20 to 100.

In the above description, the expression "the number of repetitions of the $R^2_2SiO$ units is within a range from 5 to 300" means that a structure exists in which 5 to 300 of the $R^2_2SiO$ units exist in a consecutive repeating chain. In other words, a straight-chain diorganopolysiloxane chain structure represented by the formula (1) shown below exists within the molecule of the component (A).

(1)

(wherein, m is an integer from 5 to 300)

The $R^2_2SiO$ units may also exist within the component (A) in a form that does not constitute a structure represented by the formula (1) (for example, the units may exist in isolation or within chain structures of 4 or fewer units). However, at least a part, preferably at least 50 mol % (from 50 to 100 mol %), and more preferably 80 mol % or more (80 to 100 mol %) of all the $R^2_2SiO$ units that exist within the component (A) preferably exist within a structure represented by the formula (1).

$R^2_2SiO$ units form a chain-like polymer, and then by introduction of $R^1SiO_{1.5}$ units, the chain-like polymer can be branched or converted to a three dimensional network structure. The $R^4$ groups (vinyl groups or allyl groups) within the $R^3_aR^4_bSiO_{(4-a-b)/2}$ units undergo a hydrosilylation addition reaction with the hydrogen atoms bonded to silicon atoms (namely, SiH groups) within the $R^3_cH_dSiO_{(4-c-d)/2}$ units in the component (B) described below, thereby forming a cured product.

In terms of the properties (and particularly the physical strength) of the generated cured product, the proportions of each of the units that constitute the component (A) are preferably:

from 90 to 24 mol %, and even more preferably from 70 to 28 mol % for the $R^1SiO_{1.5}$ units, from 75 to 9 mol %, and even more preferably from 70 to 20 mol % for the $R^2_2SiO$ units, and from 50 to 1 mol %, and even more preferably from 10 to 2 mol % for the $R^3_aR^4_bSiO_{(4-a-b)/2}$ units (provided the combination of the three units totals 100 mol %).

In this specification, descriptions of an organopolysiloxane as "having a resin structure" or being "resin-like" mean that the proportion of the trifunctional siloxane units $R^1SiO_{1.5}$, relative to the combined total of all the siloxane units that constitute the organopolysiloxane, is at least 20 mol %, thus enabling the formation of a three dimensional network-like siloxane structure.

Furthermore, the polystyrene equivalent weight average molecular weight of the component (A) determined by gel permeation chromatography (GPC) is typically within a range from 3,000 to 1,000,000, and molecular weight values within a range from 10,000 to 100,000 ensure that the component (A) is either a solid or semisolid at room temperature, which is preferred in terms of workability and curability.

This type of resin-structure organopolysiloxane of the component (A) can be synthesized by methods that are well known to those skilled in the art, by combining the compounds that act as the raw materials for each of the units, in quantities that enable the various units to be formed within the product in the proportions described above, and then, for example, conducting a cohydrolysis-condensation in the presence of an acid catalyst.

Examples of suitable raw materials for the $R^1SiO_{1.5}$ units include $MeSiCl_3$, $EtSiCl_3$, $PhSiCl_3$ (wherein, Me represents a methyl group, Et represents an ethyl group, and Ph represents a phenyl group, these definitions also apply below), propyltrichlorosilane, cyclohexyltrichlorosilane, and the alkoxysilanes such as methoxysilanes that correspond with each of these chlorosilanes.

Examples of suitable raw materials for the $R^2_2SiO$ units include:

$ClMe_2SiO(Me_2SiO)_nSiMe_2Cl$,
$ClMe_2SiO(Me_2SiO)_m(PhMeSiO)_nSiMe_2Cl$,
$ClMe_2SiO(Me_2SiO)_m(Ph_2SiO)_nSiMe_2Cl$,
$HOMe_2SiO(Me_2SiO)_nSiMe_2OH$,
$HOMe_2SiO(Me_2SiO)_m(PhMeSiO)_nSiMe_2OH$,
$HOMe_2SiO(Me_2SiO)_m(Ph_2SiO)_nSiMe_2OH$,
$MeOMe_2SiO(Me_2SiO)_nSiMe_2OMe$,
$MeOMe_2SiO(Me_2SiO)_m(PhMeSiO)_nSiMe_2OMe$, and
$MeOMe_2SiO(Me_2SiO)_m(Ph_2SiO)_nSiMe_2OMe$ (wherein, m is an integer from 5 to 150, and n is an integer from 5 to 300).

Furthermore, the $R^3_aR^4_bSiO_{(4-a-b)/2}$ units represent any suitable combination of one or more siloxane units selected from $R^3R^4SiO$ units, $R^3_2R^4SiO_{0.5}$ units, $R^4_2SiO$ units, and $R^3R^4{}_2SiO_{0.5}$ units, and suitable raw materials for these units include $Me_2ViSiCl$, $MeViSiCl_2$, $Ph_2ViSiCl$ (wherein, Vi represents a vinyl group, and this definition also applies below), $PhViSiCl_2$, and alkoxysilanes such as methoxysilanes that correspond with each of these chlorosilanes.

In the present invention, preferably, the organopolysiloxane of the component (A) substantially consists of $R^1SiO_{1.5}$ units, $R^2{}_2SiO$ units, and $R^3{}_aR^4{}_bSiO_{(4-a-b)/2}$ units, which means that these three types of siloxane units account for at least 90 mol % (90 to 100 mol %), particularly preferably 95 mol % or more of the whole siloxane units, and other siloxane units may account for 0 to 10 mol %, particularly preferably 0 to 5 mol % of the whole siloxane units. Specifically, in the production of the organopolysiloxane of the component (A) by cohydrolysis and condensation of the raw materials described above, in addition to the $R^1SiO_{1.5}$ units, $R^2{}_2SiO$ units, and $R^3{}_aR^4{}_bSiO_{(4-a-b)/2}$ units, silanol group-containing siloxane units may be produced as by-products typically in a quantity of about 10 mol % or less (0 to 10 mol %), preferably about 5 mol % or less (0 to 5 mol %) of the entire siloxane units. The silanol group-containing siloxane units include, for example, $R^1(HO)SiO$ units, $R^1(HO)_2SiO_{0.5}$ units, $R^2{}_2(HO)SiO_{0.5}$ units, $R^3{}_aR^4{}_b(HO)SiO_{(3-a-b)/2}$ units, and $R^3{}_aR^4{}_b(HO)_2SiO_{(2-a-b)/2}$ units (wherein, $R^1$ to $R^4$, a and b are as defined above).

—(B) Resin-structure Organohydrogenpolysiloxane—

The resin-structure (namely, three dimensional network structure) organohydrogenpolysiloxane, which represents an essential structural component of the composition of the present invention, comprises $R^1SiO_{1.5}$ units, $R^2{}_2SiO$ units, and $R^3{}_cH_dSiO_{(4-c-d)/2}$ units (wherein, $R^1$, $R^2$ and $R^3$ are as defined above, c represents 0, 1 or 2, d represents 1 or 2, and c+d is either 2 or 3), and comprising a structure in which at least a part of said $R^2{}_2SiO$ units are repeated, and the number of repetitions of the $R^2{}_2SiO$ units is preferably from 10 to 300, even more preferably from 15 to 200, and is most preferably from 20 to 100.

In the above description, the expression "the number of repetitions of the $R^2{}_2SiO$ units is within a range from 5 to 300" means that a structure exists in which 5 to 300 of the $R^2{}_2SiO$ units exist in a consecutive repeating chain. In other words, in a similar manner to the component (A), a straight-chain diorganopolysiloxane chain structure represented by the formula (1) shown below exists within the molecule of the component (B).

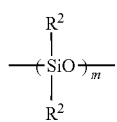

(1)

The $R^2{}_2SiO$ units may also exist within the component (B) in a form that does not constitute a structure represented by the formula (1) (for example, the units may exist in isolation or within chain structures of 4 or fewer units). However, at least a part, preferably at least 50 mol % (from 50 to 100 mol %), and more preferably 80 mol % or more (80 to 100 mol %) of all the $R^2{}_2SiO$ units that exist within the component (B) preferably exist within a structure represented by the formula (1).

The functions of the $R_1SiO_{1.5}$ units, $R^2{}_2SiO$ units, and $R^3{}_cH_dSiO_{(4-c-d)/2}$ units are as described above in relation to the component (A).

In terms of the properties (and particularly the physical strength) of the generated cured product, the proportions of each of the units that constitute the component (B) are preferably:

from 90 to 24 mol %, and even more preferably from 70 to 28 mol % for the $R^1SiO_{1.5}$ units, from 75 to 9 mol %, and even more preferably from 70 to 20 mol % for the $R^2{}_2SiO$ units, and from 50 to 1 mol %, and even more preferably from 10 to 2 mol % for the $R^3{}_cH_dSiO_{(4-c-d)/2}$ units (provided the combination of the three units totals 100 mol %).

Furthermore, the polystyrene equivalent weight average molecular weight of the component (B) determined by GPC is typically within a range from 3,000 to 1,000,000, and molecular weight values within a range from 10,000 to 100,000 are preferred in terms of workability and the properties of the cured product.

This type of resin-structure organohydrogenpolysiloxane can be synthesized by methods that are well known to those skilled in the art, by combining the compounds that act as the raw materials for each of the units, in quantities that enable the various units to be formed within the product in the proportions described above, and then conducting a cohydrolysis.

Examples of suitable raw materials for the $R^1SiO_{1.5}$ units include $MeSiCl_3$, $EtSiCl_3$, $PhSiCl_3$, propyltrichlorosilane, cyclohexyltrichlorosilane, and the alkoxysilanes such as methoxysilanes that correspond with each of these chlorosilanes.

Examples of suitable raw materials for the $R^2{}_2SiO$ units include:
$ClMe_2SiO(Me_2SiO)_nSiMe_2Cl$,
$ClMe_2SiO(Me_2SiO)_m(PhMeSiO)_nSiMe_2Cl$,
$ClMe_2SiO(Me_2SiO)_m(Ph_2SiO)_nSiMe_2Cl$,
$HOMe_2SiO(Me_2SiO)_nSiMe_2OH$,
$HOMe_2SiO(Me_2SiO)_m(PhMeSiO)_nSiMe_2OH$,
$HOMe_2SiO(Me_2SiO)_m(Ph_2SiO)_nSiMe_2OH$,
$MeOMe_2SiO(Me_2SiO)_nSiMe_2OMe$,
$MeOMe_2SiO(Me_2SiO)_m(PhMeSiO)_nSiMe_2OMe$, and
$MeOMe_2SiO(Me_2SiO)_m(Ph_2SiO)_nSiMe_2OMe$ (wherein, m is an integer from 5 to 150 on average, and n is an integer from 5 to 300 on average).

Furthermore, the $R^3{}_cH_dSiO_{(4-c-d)/2}$ units represent any suitable combination of one or more siloxane units selected from $R^3HSiO$ units, $R^3{}_2HSiO_{0.5}$ units, $H_2SiO$ units, and $R^3H_2SiO_{0.5}$ units, and suitable raw materials for these units include $Me_2HSiCl$, $MeHSiCl_2$, $Ph_2HSiCl$, $PhHSiCl_2$, and alkoxysilanes such as methoxysilanes that correspond with each of these chlorosilanes.

In the present invention, preferably, the organohydrogenpolysiloxane of the component (B) substantially consists of $R^1SiO_{1.5}$ units, $R^2{}_2SiO$ units, and $R^3{}_cH_dSiO_{(4-c-d)/2}$ units, which means that these three types of siloxane units account for at least 90 mol % (90 to 100 mol %), particularly preferably 95 mol % or more of the whole siloxane units, and other siloxane units may account for 0 to 10 mol %, particularly preferably 0 to 5 mol % of the whole siloxane units. Specifically, in the production of the organohydrogenpolysiloxane of the component (B) by cohydrolysis and condensation of the raw materials described above, in addition to the $R^1SiO_{1.5}$ units, $R^2{}_2SiO$ units, and $R^3{}_cH_dSiO_{(4-c-d)/2}$ units, silanol group-containing siloxane units may be produced as by-products typically in a quantity of about 10 mol % or less (0 to 10 mol %), preferably about 5 mol % or less (0 to 5 mol %) of the entire siloxane units. The silanol group-containing siloxane units include, for example, $R^1$(HO)SiO units, $R^1$(HO)$_2$SiO$_{0.5}$ units, $R^2{}_2$(HO)SiO$_{0.5}$ units, $R^3{}_cH_d$(HO)SiO$_{(3-c-d)/2}$ units, and $R^3{}_cH_d$(HO)$_2$SiO$_{(2-c-d)/2}$ units (wherein, $R^1$ to $R^3$, c and d are as defined above).

Incidentally, in the composition according to the present invention, the at least one of the component (A) and the component (B) preferably has silanol groups because adhesion of the composition to substrates of a variety of materials is advantageously improved.

The blend quantity of this organohydrogenpolysiloxane of the component (B) is sufficient that the molar ratio of hydrogen atoms bonded to silicon atoms (SiH groups) within the component (B), relative to the total quantity of vinyl groups and allyl groups within the component (A), is within a range from 0.1 to 4.0, and preferably from 0.5 to 3.0, and even more preferably from 0.8 to 2.0. If this ratio is less than 0.1, then the curing reaction does not proceed, and achieving a silicone cured product becomes difficult, whereas if the ratio exceeds 4.0, then a large quantity of unreacted SiH groups remains within the cured product, which can cause changes in the properties of the cured product over time.

In the component (B), silanol group-containing siloxane units, which are generated amongst the $R^1$SiO$_{1.5}$ units, $R^2{}_2$SiO units and/or $R^3{}_cH_d$SiO$_{(4-c-d)/2}$ units as by-products of the cohydrolysis and condensation reactions, may typically account for up to 10 mol % (0 to 10 mol %), but preferably not more than 5 mol % (0 to 5 mol %) of the combined total of all the siloxane units that constitute the component (B).

—(C) Platinum Group Metal-based Catalyst—

This catalyst component is added to initiate the addition curing reaction within the composition of the present invention, and is typically a platinum-based, palladium-based, or rhodium-based catalyst. From the viewpoint of cost, platinum-based catalysts such as platinum, platinum black, chloroplatinic acid, platinum compounds such as $H_2PtCl_6.mH_2O$, $K_2PtCl_6$, $KHPtCl_6.mH_2O$, $K_2PtCl_4$, $K_2PtCl_4.mH_2O$ and $PtO_2.mH_2O$ (wherein, m represents a positive integer), and complexes of these compounds with hydrocarbons such as olefins, alcohols, or vinyl group-containing organopolysiloxanes are preferred. These catalysts may be used either alone, or in combinations of two or more different catalysts. The blend quantity of this catalyst component need only be an effective quantity, that is, a so-called catalytic quantity, and a typical quantity, calculated as a mass of the platinum group metal relative to the combined mass of the aforementioned components (A) and (B), is within a range from 0.1 to 500 ppm, and is preferably from 0.5 to 100 ppm.

—(D) Phosphor—

The phosphor of the component (D) may use any conventional phosphor, and the blend quantity of the phosphor is typically within a range from 0.1 to 100 parts by mass per 100 parts by mass of the combination of all of the components (A) through (C). The particle size range for the phosphor of the component (D), measured, for example, with a Selas laser measurement apparatus or the like using a particle size distribution measurement based on a laser diffraction method, is typically 10 nm or greater, and is preferably within a range from 10 nm to 10 μm, and even more preferably from 10 nm to 1 μm.

The fluorescent material may be any material which, for example, absorbs the light emitted from a semiconductor light emitting diode that employs a nitride-based semiconductor as the light emitting layer, and performs a wavelength conversion that alters the wavelength of the light to a different wavelength. For example, one or more materials selected from amongst nitride-based phosphors or oxynitride-based phosphors activated mainly with lanthanoid elements such as Eu or Ce, alkaline earth halogen apatite phosphors, alkaline earth metal halogen borate phosphors, alkaline earth metal aluminate phosphors, alkaline earth silicate phosphors, alkaline earth sulfide phosphors, alkaline earth thiogallate phosphors, alkaline earth silicon nitride phosphors and germanate phosphors activated mainly with lanthanoid elements such as Eu or transition metal elements such as Mn, rare earth aluminate phosphors and rare earth silicate phosphors activated mainly with lanthanoid elements such as Ce, organic or organic complex phosphors activated mainly with lanthanoid elements such as Eu, and Ca—Al—Si—O—N based oxynitride glass phosphors are preferred. Specifically, the phosphors listed below can be used, although the following is not a restrictive list.

Examples of nitride-based phosphors activated mainly with lanthanoid elements such as Eu or Ce include $M_2Si_5N_8$:Eu (wherein, M is at least one element selected from Sr, Ca, Ba, Mg and Zn). Furthermore, other examples in addition to $M_2Si_5N_8$:Eu include $MSi_7N_{10}$:Eu, $M_{1.8}Si_5O_{0.2}N_8$:Eu, and $M_{0.9}Si_7O_{0.1}N_{10}$:Eu (wherein, M is at least one element selected from Sr, Ca, Ba, Mg and Zn).

Examples of oxynitride-based phosphors activated mainly with lanthanoid elements such as Eu or Ce include $MSi_2O_2N_2$:Eu (wherein, M is at least one element selected from Sr, Ca, Ba, Mg and Zn).

Examples of alkaline earth halogen apatite phosphors activated mainly with lanthanoid elements such as Eu or transition metal elements such as Mn include $M_5(PO_4)_3X$:R (wherein, M represents at least one element selected from Sr, Ca, Ba, Mg and Zn, X represents at least one element selected from F, Cl, Br and I, and R represents one or more of Eu, Mn, and a combination of Eu and Mn).

Examples of alkaline earth metal halogen borate phosphors include $M_2B_5O_9X$:R (wherein, M represents at least one element selected from Sr, Ca, Ba, Mg and Zn, X represents at least one element selected from F, Cl, Br and I, and R represents one or more of Eu, Mn, and a combination of Eu and Mn).

Examples of alkaline earth metal aluminate phosphors include $SrAl_2O_4$:R, $Sr_4Al_{14}O_{25}$:R, $CaAl_2O_4$:R, $BaMg_2Al_{16}O_{27}$:R, $BaMg_2Al_{16}O_{12}$:R, and $BaMgAl_{10}O_{17}$:R (wherein, R represents one or more of Eu, Mn, and a combination of Eu and Mn).

Examples of alkaline earth sulfide phosphors include $La_2O_2S$:Eu, $Y_2O_2S$:Eu, and $Gd_2O_2S$:Eu.

Examples of rare earth aluminate phosphors activated mainly with lanthanoid elements such as Ce include YAG phosphors represented by compositional formulas such as $Y_3Al_5O_{12}$:Ce, $(Y_{0.8}Gd_{0.2})_3Al_5O_{12}$:Ce, $Y_3(Al_{0.8}Ga_{0.2})_5O_{12}$:Ce, and $(Y,Gd)_3(Al,Ga)_5O_{12}$. Furthermore, other examples include phosphors such as $Tb_3Al_5O_{12}$:Ce and $Lu_3Al_5O_{12}$:Ce in which a portion of, or all of, the Y has been replaced with Tb or Lu or the like.

Examples of other phosphors include ZnS:Eu, $Zn_2GeO_4$:Mn and $MGa_2S_4$:Eu (wherein, M represents at least one element selected from Sr, Ca, Ba, Mg and Zn).

The above phosphors may also comprise one or more elements selected from Tb, Cu, Ag, Au, Cr, Nd, Dy, Co, Ni and Ti, either instead of Eu or in addition to Eu.

Ca—Al—Si—O—N based oxynitride glass phosphors describe phosphors in which the matrix material is an oxynitride glass comprising from 20 to 50 mol % of $CaCO_3$ calculated as CaO, from 0 to 30 mol % of $Al_2O_3$, from 25 to 60 mol % of SiO, from 5 to 50 mol % of AlN, and from 0.1 to 20 mol % of rare earth oxides or transition metal oxides, provided that the combination of these five materials totals 100 mol %.

In a phosphor that employs an oxynitride glass as the matrix material, the nitrogen content is preferably not higher than 15 wt %, and in addition to the rare earth oxide ions, another rare earth element ion that functions as a sensitizer is preferably included within the phosphor glass in the form of a rare earth oxide in a quantity within a range from 0.1 to 10 mol % so as to function as a co-activator.

Furthermore, other phosphors that offer similar performance and effects to the phosphors listed above can also be used.

Particularly in those cases where the resin composition of the present invention is used for sealing or coating a light emitting device such as an LED element, the cured product excluding the component (D), namely, the cured product obtained by curing the resin composition without adding the component (D), preferably exhibits a light transmittance in the visible light region from 400 nm that is 90% or greater (namely, from 90 to 100%), and even more preferably 92% or greater (from 92 to 100%).

—Other Components—

In addition to the components (A) through (C) described above, the composition of the present invention may also include various conventional additives as required. For example, reinforcing inorganic fillers such as fumed silica and fumed titanium dioxide, and non-reinforcing inorganic fillers such as calcium carbonate, calcium silicate, titanium dioxide, and zinc oxide may be added to the composition in quantities totaling not more than 600 parts by mass (from 0 to 600 parts by mass) per 100 parts by mass of the combination of components (A) and (B).

Furthermore, in order to impart adhesiveness to the composition of the present invention, an adhesion assistant such as a straight-chain or cyclic organosiloxane oligomer of 4 to 50 silicon atoms, and preferably 4 to 20 silicon atoms, comprising at least two, and preferably either two or three, functional groups selected from amongst a hydrogen atom bonded to a silicon atom (SiH group), alkenyl group bonded to a silicon atom (such as a Si—CH=CH$_2$ group), alkoxysilyl group (such as a trimethoxysilyl group) and epoxy group (such as a glycidoxypropyl group or 3,4-epoxycyclohexylethyl group) within each molecule, or an organooxysilyl-modified isocyanurate compound represented by a general formula (2) shown below and/or a hydrolysis-condensation product thereof (organosiloxane-modified isocyanurate compound) may be added as required to the composition as an optional component.

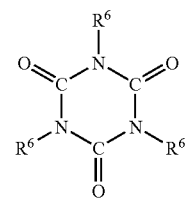

(2)

(wherein, $R^6$ represents an organic group represented by a formula (3) shown below:

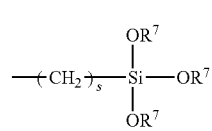

(3)

or a monovalent hydrocarbon group comprising an aliphatic unsaturated bond, provided that at least one of the $R^6$ groups is an organic group of the formula (3), $R^7$ represents a hydrogen atom or a monovalent hydrocarbon group of 1 to 6 carbon atoms, and s represents an integer from 1 to 6, and preferably from 1 to 4)

In such cases, examples of the monovalent hydrocarbon group comprising an aliphatic unsaturated bond represented by $R^6$ include alkenyl groups of 2 to 8, and preferably 2 to 6 carbon atoms, such as a vinyl group, allyl group, propenyl group, isopropenyl group, butenyl group, isobutenyl group, pentenyl group or hexenyl group, and cycloalkenyl groups of 6 to 8 carbon atoms such as a cyclohexenyl group. Furthermore, examples of the monovalent hydrocarbon group represented by $R^7$ include monovalent hydrocarbon groups of 1 to 8, and preferably 1 to 6 carbon atoms, including alkyl groups such as a methyl group, ethyl group, propyl group, isopropyl group, butyl group, isobutyl group, tert-butyl group, pentyl group or hexyl group, cycloalkyl groups such as a cyclohexyl group, the alkenyl groups and cycloalkenyl groups exemplified for the aforementioned $R^6$ group, and aryl groups such as a phenyl group, although alkyl groups are preferred.

Specific examples of suitable adhesion assistants include the compounds represented by the formulas shown below.

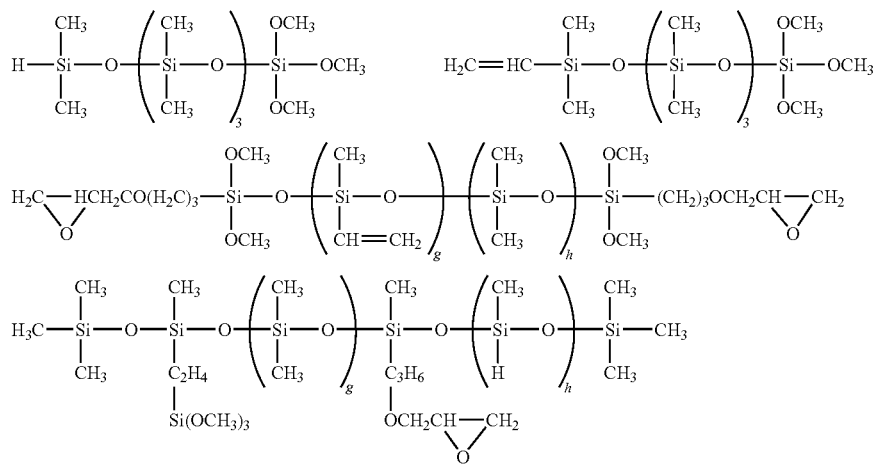

(wherein, g and h each represent an integer from 1 to 49, provided that g+h is from 2 to 50, and preferably from 4 to 20)

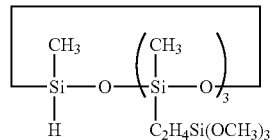

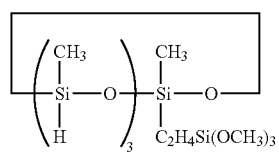

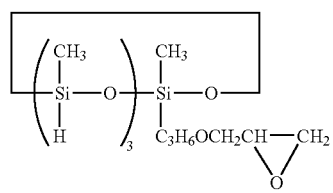

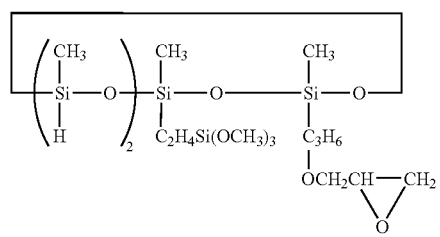

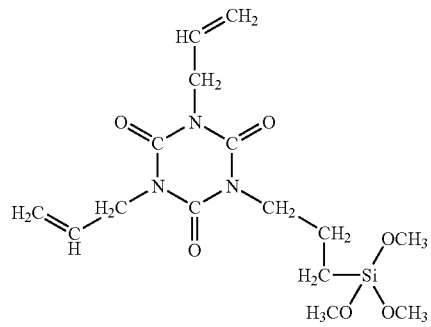

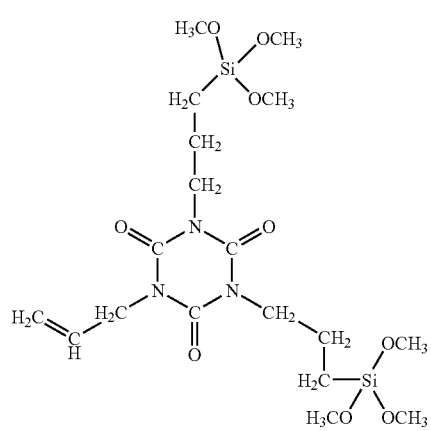

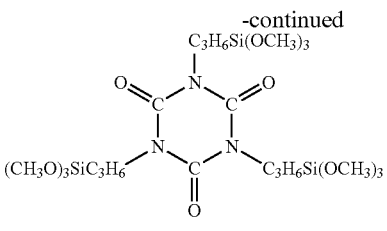

Of these types of organosilicon compounds, organosilicon compounds having a silicon atom-bonded alkoxy group and an alkenyl group or silicon atom-bonded hydrogen atom (SiH group) within each molecule are preferred as they yield cured products with particularly superior adhesion.

In a typical embodiment of the composition according to the present invention, there is provided a composition substantially consisting of the components (A) to (D), which means the composition may contain at least one member of the optional components described above in addition to the components (A) to (D) within ranges of quantities which do not impair the objects of or effects to be provided by the present invention.

In the present invention, the blend quantity of the adhesion assistant (an optional component) is typically not more than 10 parts by mass (namely, from 0 to 10 parts by mass), and is preferably from 0.1 to 8 parts by mass, and even more preferably from 0.2 to 5 parts by mass, per 100 parts by mass of the combination of the component (A) and the component (B). If the blend quantity is too small, then the adhesion may be inferior, whereas blend quantities that are too large can have adverse effects on the hardness or surface tackiness of the cured product.

A silicone composition of the present invention is prepared by mixing each of the above components uniformly together, although in order to ensure curing does not proceed, the composition is usually stored as two separate liquids, and these two liquids are then mixed together and cured at the time of use. Needless to say, a one-pot composition containing a small quantity of a curing inhibitor such as acetylene alcohol can also be used. This composition can be cured immediately by heating if necessary, and forms a flexible cured product with a high degree of hardness and no surface tackiness, and because the cured product comprises a phosphor, it can be widely used within LED applications where the silicone stickiness of LED surface coatings and the like is problematic, including as a protective coating, potting material, casting material or molding material for blue LED components or the like.

The curing conditions during molding typically involve heating at 50 to 200° C., and particularly 70 to 180° C., for 1 to 30 minutes, and particularly 2 to 10 minutes. Furthermore, post-curing may also be conducted at 50 to 200° C., and particularly 70 to 180° C., for 0.1 to 10 hours, and particularly 1 to 4 hours.

The composition of the present invention is either solid or semisolid at room temperature, and is therefore easy to handle and can be applied to conventional molding methods. Furthermore, by adding a solvent, the composition is also effective as a coating agent or potting agent.

EXAMPLES

As follows is a more detailed description of the present invention using a series of synthesis examples, examples, and comparative examples, although the present invention is in no way restricted by the following examples. In the following examples, viscosity values refer to values at 25° C. Furthermore, weight average molecular weight values are polystyrene-equivalent values measured using gel permeation chromatography (GPC). Ph represents a phenyl group, Me represents a methyl group, and Vi represents a vinyl group.

Synthesis Example 1

—Vinyl Group-containing Organopolysiloxane Resin (A1)—

27 mols of an organosilane represented by $PhSiCl_3$, 1 mol of $ClMe_2SiO(Me_2SiO)_{33}SiMe_2Cl$, and 3 mols of $MeViSiCl_2$ were dissolved in toluene solvent, the solution was added dropwise to water to effect a cohydrolysis, the product was washed with water, neutralized by alkali washing, dewatered, and the solvent was then stripped, yielding a vinyl group-containing resin (A1). The weight average molecular weight of this resin was 62,000, and the melting point was 60° C.

Synthesis Example 2

—Hydrosilyl Group-containing Organopolysiloxane Resin (B1)—

27 mols of the organosilane represented by $PhSiCl_3$, 1 mol of $ClMe_2SiO(Me_2SiO)_{33}SiMe_2Cl$, and 3 mols of $MeHSiCl_2$ were dissolved in toluene solvent, the solution was added dropwise to water to effect a cohydrolysis, the product was washed with water, neutralized by alkali washing, dewatered, and the solvent was then stripped, yielding a hydrosilyl group-containing resin (B1). The weight average molecular weight of this resin was 58,000, and the melting point was 58° C.

Synthesis Example 3

—Vinyl Group-containing Organopolysiloxane Resin (A2)—

27 mols of the organosilane represented by $PhSiCl_3$, 1 mol of $ClMe_2SiO(Me_2SiO)_{33}SiMe_2Cl$, and 3 mols of $Me_2ViSiCl$ were dissolved in toluene solvent, the solution was added dropwise to water to effect a cohydrolysis, the product was washed with water, neutralized by alkali washing, dewatered, and the solvent was then stripped, yielding a vinyl group-containing resin (A2). The weight average molecular weight of this resin was 63,000, and the melting point was 63° C.

Synthesis Example 4

—Hydrosilyl Group-containing Organopolysiloxane Resin (B2)—

27 mols of the organosilane represented by $PhSiCl_3$, 1 mol of $ClMe_2SiO(Me_2SiO)_{33}SiMe_2Cl$, and 3 mols of $Me_2HSiCl$ were dissolved in toluene solvent, the solution was added dropwise to water to effect a cohydrolysis, the product was washed with water, neutralized by alkali washing, dewatered, and the solvent was then stripped, yielding a hydrosilyl group-containing resin (B2). The weight average molecular weight of this resin was 57,000, and the melting point was 56° C.

Example 1

To 90 parts by mass of a composition comprising 189 g of the vinyl group-containing resin (A1) of the synthesis example 1, 189 g of the hydrosilyl group-containing resin (B1) from the synthesis example 2, 0.2 g of the acetylene alcohol-based compound ethynylcyclohexanol as a reaction retarder, and 0.1 g of an octyl alcohol-modified solution of chloroplatinic acid was added 10 parts by mass of a phosphor (YAG) with a particle size of 5 µm (average particle size), and the resulting mixture was mixed thoroughly in a planetary mixer heated at 60° C., thereby yielding a silicone resin composition. This composition was a plastic solid at 25° C.

This composition was subjected to the following evaluations.

1) Mechanical Strength

Compression molding was conducted using a compression molding device, with heat-molding conducted at 150° C. for 5 minutes to yield a cured product. This cured product was then subjected to secondary curing at 150° C. for 4 hours, and the resulting product was measured for tensile strength (0.2 mm thickness), hardness (measured using a type D spring tester), and elongation (0.2 mm thickness) in accordance with JIS K 6251 and JIS K 6253.

2) Surface Tackiness

The tackiness of the surface of the cured product obtained upon secondary curing in the manner described above was ascertained by finger touch. In addition, the cured product was placed in a sample of commercially available silver powder (average particle size: 5 µm), and following removal from the powder, the product was blown with air to test whether the silver powder that had adhered to the surface like dust could be removed.

3) Dispersion Stability of Phosphor

A depression with a diameter of 6 mm, a central depth of 2 mm, and a concave bottom surface formed in an alumina base was filled with a resin composition immediately following preparation in the manner described above, and heat-curing was then conducted under the same conditions a those described above, yielding a lens molded product 1 with the shape shown in FIG. 1. Samples were cut from an upper portion 2 and a lower portion 3 of the lens molded product 1, each sample was ashed by heating to 800° C., the quantity (mass %) of phosphor within each ash sample was measured, and the quantities of phosphor within the upper portion 2 and the lower portion 3 were compared. Moreover, another sample of the same composition was stored in a freezer at −20° C. for 3 months, and the composition was then used to mold a lens molded product in the same manner as described above, and the quantities of phosphor within the upper portion and lower portion were compared in the same manner as described above. This method was used to measure the dispersion stability of the phosphor.

These measurement results are shown in Table 1.

Example 2

To 70 parts by mass of a composition comprising 189 g of the vinyl group-containing resin (A2) of the synthesis example 3, 189 g of the hydrosilyl group-containing resin (B2) from the synthesis example 4, 0.2 g of the acetylene alcohol-based compound ethynylcyclohexanol as a reaction retarder, and 0.1 g of an octyl alcohol-modified solution of chloroplatinic acid was added 30 parts by mass of a phosphor (YAG) with a particle size of 5 µm (average particle size), and the resulting mixture was mixed thoroughly in a planetary mixer heated at 60° C., thereby yielding a silicone resin composition. This composition was a plastic solid at 25° C. The composition was evaluated in the same manner as the example 1. The results are shown in Table 1.

Comparative Example 1

Instead of using the silicone resin composition prepared in the example 1, 10 parts by mass of the same phosphor (YAG)

as the example 1, with a particle size of 5 μm (average particle size), was added to 90 parts by mass of a commercially available addition reaction-curable silicone varnish KJR-632 (a product name, manufactured by Shin-Etsu Chemical Co., Ltd.), which does not comprise a straight-chain diorganopolysiloxane consecutive chain structure with 5 to 300 repeating units, but rather comprises a liquid vinyl group-containing organopolysiloxane resin as the primary component, and the resulting mixture was mixed thoroughly in a planetary mixer heated at 60° C., yielding a composition which was then evaluated in the same manner as the example 1. The results are shown in Table 1.

Comparative Example 2

Instead of using the silicone resin composition prepared in the example 1, 30 parts by mass of the same phosphor (YAG) as the example 1, with a particle size of 5 μm (average particle size), was added to 70 parts by mass of a commercially available addition reaction-curable silicone varnish KJR-632L-1 (a product name, manufactured by Shin-Etsu Chemical Co., Ltd.), which does not comprise a straight-chain diorganopolysiloxane consecutive chain structure with 5 to 300 repeating units, but rather comprises a liquid vinyl group-containing organopolysiloxane resin as the primary component, and the resulting mixture was mixed thoroughly in a planetary mixer heated at 60° C., yielding a composition which was then evaluated in the same manner as the example 1. The results are shown in Table 1.

said component (A-1) consisting of 90 to 24 mol % of $R^1SiO_{1.5}$ siloxane units, 75 to 9 mol % of $R^2_2SiO$ siloxane units, and 50 to 1 mol % of $R^3_aR^4_bSiO_{(4-a-b)/2}$ siloxane units, said component (A-1) having a structure in which at least a part of said $R^2_2SiO$ units are repeated, and a number of repetitions of said $R^2_2SiO$ units is within a range from 5 to 300, and said resin-structure organopolysiloxane in a solid or semisolid state at room temperature;

(B) a resin-structure organohydrogenpolysiloxane consisting essentially of (B-1) at least 90 mol % of a total of $R^1SiO_{1.5}$ siloxane units, $R^2_2SiO$ siloxane units, and $R^3_cH_dSiO_{(4-c-d)/2}$ siloxane units wherein, $R^1$, $R^2$ and $R^3$ are as defined above, c represents 0, 1 or 2, d represents 1 or 2, c+d is either 2 or 3, and (B-2) 0 to 10 mol % of at least one silanol-containing siloxane unit, said component (B-1) having a structure in which at least a part of said $R^2_2SiO$ units are repeated, and a number of repetitions of said $R^2_2SiO$ units is within a range from 5 to 300, and having a polystyrene equivalent weight average molecular weight determined by GPC within a range from 3,000 to 1,000,000, said organohydro-

TABLE 1

| | Example 1 | Example 2 | Comparative example 1 | Comparative example 2 |
|---|---|---|---|---|
| SiH/SiVi(*1) | 1.0 | 1.0 | 1.0 | 1.0 |
| Secondary curing conditions | 150° C. × 4 hr | 150° C. × 4 hr | 150° C. × 4 hr | 150° C. × 4 hr |
| Hardness (type D) | 55 | 60 | 75 | 80 |
| Elongation (%) | 15 | 15 | 0 | 0 |
| Tensile strength (MPa) | 8 | 8 | 1 | 1 |
| Silver powder adhesion caused by surface tackiness | No | No | No | No |
| Phosphor content (immediately after preparation) Upper portion: Lower portion (mass %) | Upper 10: lower 10 (no variation) | Upper 30: lower 30 (no variation) | Upper 8: lower 11 | Upper 26: lower 33 |
| Phosphor content (3 months after preparation) Upper portion: Lower portion (mass %) | Upper 10: lower 10 (no variation) | Upper 30: lower 30 (no variation) | Upper 2: lower 18 | Upper 3: lower 50 |

(Notes)
(*1)The molar ratio of silicon atom-bonded hydrogen atoms within the hydrosilyl group-containing resin relative to silicon atom-bonded vinyl groups within the vinyl group-containing resin.

What is claimed is:

1. A curable silicone resin composition which is a solid or a semisolid at room temperature, comprising:

(A) a resin-structure organopolysiloxane consisting essentially of (A-1) at least 90 mol % of a total of $R^1SiO_{1.5}$ siloxane units, $R^2_2SiO$ siloxane units, and $R^3_aR^4_bSiO_{(4-a-b)/2}$ siloxane units wherein, $R^1$, $R^2$ and $R^3$ each represent, independently, a methyl group, ethyl group, propyl group, cyclohexyl group or phenyl group, $R^4$ represents a vinyl group or allyl group, a represents 0, 1 or 2, b represents 1 or 2, a+b is either 2 or 3, and (A-2) 0 to 10 mol % of at least one silanol-containing siloxane unit, genpolysiloxane present in sufficient quantity that a molar ratio of hydrogen atoms bonded to silicon atoms within component (B), relative to vinyl groups or allyl groups within component (A), is within a range from 0.1 to 4.0;

(C) an effective quantity of at least one platinum group metal-comprising catalyst; and (D) at least one phosphor.

2. The curable silicone resin composition according to claim 1, wherein component (A) has a polystyrene equivalent weight average molecular weight determined by GPC within a range from 3,000 to 1,000,000.

3. The curable silicone resin composition according to claim 1, wherein the molar ratio of hydrogen atoms bonded to silicon atoms within component (B), relative to vinyl groups or allyl groups within component (A), is within a range from 0.5 to 3.0.

4. The curable silicone resin composition according to claim 1, wherein a cured product of said composition excluding component (D) has a light transmittance of 90% or greater in a visible light region from 400 nm.

5. The curable silicone resin composition according to claim 1, wherein said phosphor of component (D) is an inorganic phosphor with a particle size of 10 nm or greater.

6. The curable silicone resin composition according to claim 1, which is used for sealing an LED element.

7. A silicone resin cured product obtained by curing the curable silicone resin composition defined in claim 1.

8. The curable silicone resin composition according to claim 1, which is a plastic solid.

9. The curable silicone resin composition according to claim 1, wherein component (A-1) consists essentially of 70 to 28 mol % of $R^1SiO_{1.5}$ units, 70 to 20 mol % of $R^2_2SiO$ units, and 10 to 2 mol % of $R^3_aR^4_bSiO_{(4-a-b)/2}$.

10. The curable silicone resin composition according to claim 1, wherein component (B-1) consists essentially of 70 to 28 mol % of $R^1SiO_{1.5}$ units, 70 to 20 mol % of $R^2_2SiO$ units, and 10 to 2 mol % of $R^3_cH_dSiO_{(4-c-d)/2}$.

11. The curable silicone resin composition according to claim 1, wherein the molar ratio of hydrogen atoms bonded to silicon atoms within component (B), relative to vinyl groups or allyl groups within component (A), is within a range from 0.8 to 2.0.

12. The curable silicone resin composition according to claim 1, wherein said at least one platinum group metal-comprising catalyst is selected from the group consisting of platinum, platinum black, chloroplatinic acid, $H_2PtCl_6 \cdot mH_2O$, $K_2PtCl_6$, $KHPtCl_6 \cdot mH_2O$, $K_2PtCl_4$, $K_2PtCl_4 \cdot mH_2O$, $PtO_2 \cdot mH_2O$, an olefin complex thereof, an alcohol complex thereof, and a vinyl group-containing organopolysiloxane complex thereof, wherein m represents a positive integer, and wherein said at least one platinum group metal-comprising catalyst is present in an amount of from 0.1 to 500 ppm relative to the combined mass of components (A) and (B).

13. The curable silicone resin composition according to claim 1, wherein a cured product of said composition excluding component (D) has a light transmittance of 92% or greater in a visible light region from 400 nm.

14. The curable silicone resin composition according to claim 1, further comprising at least one adhesion assistant selected from the group consisting of a straight-chain or cyclic organosiloxane oligomer of 4 to 50 silicon atoms comprising at least two functional groups selected from the group consisting of a SiH group, a Si—CH=CH₂ group, an alkoxysilyl group and an epoxy group;

an organooxysilyl-modified isocyanurate compound represented by general formula (2)

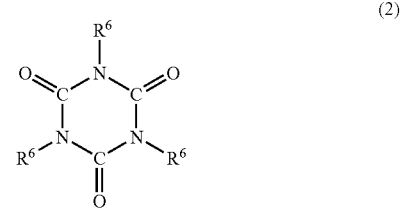

wherein, $R^6$ represents an organic group represented by formula (3):

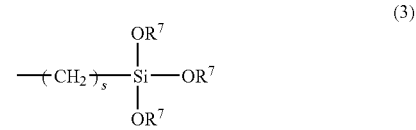

or a monovalent hydrocarbon group comprising an aliphatic unsaturated bond, provided that at least one of the $R^6$ groups is an organic group of the formula (3), $R^7$ represents a hydrogen atom or a monovalent hydrocarbon group of 1 to 6 carbon atoms, and s represents an integer from 1 to 6; and a hydrolysis-condensation product thereof.

15. The curable silicone resin composition according to claim 14, wherein said at least one adhesion assistant is present in an amount of from not more than 10 parts by mass per 100 parts by mass of components (A) and (B).

16. The curable silicone resin composition according to claim 1, wherein the number of repetitions of said $R^2_2SiO$ units for at least one of component (A-1) and (B-1) is within a range from 10 to 300.

17. The curable silicone resin composition according to claim 1, wherein the number of repetitions of said $R^2_2SiO$ units for at least one of component (A-1) and (B-1) is within a range from 15 to 200.

18. The curable silicone resin composition according to claim 1, wherein the number of repetitions of said $R^2_2SiO$ units for at least one of component (A-1) and (B-1) is within a range from 20 to 100.

19. The curable silicone resin composition according to claim 1, wherein said phosphor of component (D) is present in an amount of from 0.1 to 100 parts by mass per 100 parts by mass of the combination of all of the components (A) through (C).

* * * * *